US012598541B2

(12) United States Patent
Gershoni et al.

(10) Patent No.: US 12,598,541 B2
(45) Date of Patent: Apr. 7, 2026

(54) ELECTRONIC DEVICES WITH FREQUENCY SCAN ACCELERATION

(71) Applicant: Apple Inc., Cupertino, CA (US)

(72) Inventors: Shay Gershoni, Hadera (IL); Ran Shimon, Givatayim (IL); Aviv Gonen, Tel Aviv (IL); Itan Levin, Tel Aviv (IL); Ran Berliner, Kfar Aviv (IL)

(73) Assignee: Apple Inc., Cupertino, CA (US)

( * ) Notice: Subject to any disclaimer, the term of this patent is extended or adjusted under 35 U.S.C. 154(b) by 908 days.

(21) Appl. No.: 17/835,837

(22) Filed: Jun. 8, 2022

(65) Prior Publication Data

US 2023/0104402 A1 Apr. 6, 2023

Related U.S. Application Data

(60) Provisional application No. 63/248,200, filed on Sep. 24, 2021.

(51) Int. Cl.
| | |
|---|---|
| *H04W 48/16* | (2009.01) |
| *H04W 56/00* | (2009.01) |
| *H04W 72/0453* | (2023.01) |
| *H04W 72/23* | (2023.01) |

(52) U.S. Cl.
CPC ....... *H04W 48/16* (2013.01); *H04W 56/0035* (2013.01); *H04W 72/0453* (2013.01); *H04W 72/23* (2023.01)

(58) Field of Classification Search
CPC .......................... H04J 11/0069; H04J 11/0086
See application file for complete search history.

(56) References Cited

U.S. PATENT DOCUMENTS

| | | | |
|---|---|---|---|
| 7,369,534 | B2 | 5/2008 | Amerga et al. |
| 7,424,067 | B2 | 9/2008 | Vanderperren et al. |
| 8,340,072 | B2 | 12/2012 | Ma et al. |
| 9,450,801 | B2 | 9/2016 | Ma et al. |
| 9,480,006 | B2 | 10/2016 | Malladi et al. |
| 9,832,063 | B2 | 11/2017 | Ma et al. |
| 10,200,169 | B2 | 2/2019 | Lei et al. |
| 10,624,024 | B2 | 4/2020 | Sahin et al. |

(Continued)

FOREIGN PATENT DOCUMENTS

| | | | | |
|---|---|---|---|---|
| JP | 2007060116 A | * | 3/2007 | .......... H04J 11/0086 |

*Primary Examiner* — Joseph A Bednash
(74) *Attorney, Agent, or Firm* — Treyz Law Group, P.C.; Michael H. Lyons

(57) ABSTRACT

An electronic device having a radio is provided. When the radio boots up, the radio may search for downlink signals transmitted by a wireless base station. The device may generate a narrow set of candidate frequencies over which to search for the downlink signals by leveraging a cyclic prefix autocorrelation property of the downlink signals. Each candidate frequency may have a corresponding center frequency offset (CFO) and symbol boundary timing correction that is used when searching over the narrow set of candidate frequencies. To generate the narrow set of candidate frequencies, control circuitry may generate autocorrelated signals from baseband-shifted input signals over a set of different center frequencies and bandwidths. Searching over the narrow set of candidate frequencies may be significantly faster than performing a full raster scan over all frequencies supported by the radio.

20 Claims, 8 Drawing Sheets

(56) References Cited

U.S. PATENT DOCUMENTS

2005/0163094 A1\* 7/2005 Okada ................. H04L 27/2605
                                                              370/343
2008/0198070 A1\* 8/2008 Wang ........................ H03J 7/04
                                                             342/357.62
2009/0147341 A1\* 6/2009 Muenter ............. G01B 9/0209
                                                              359/238
2011/0103534 A1\* 5/2011 Axmon ............... H04L 27/2657
                                                              375/371
2013/0129007 A1\* 5/2013 Kumar Reddy .... H04L 27/2607
                                                              375/295
2016/0116599 A1\* 4/2016 Turner ................... G01S 19/29
                                                             342/357.68

\* cited by examiner

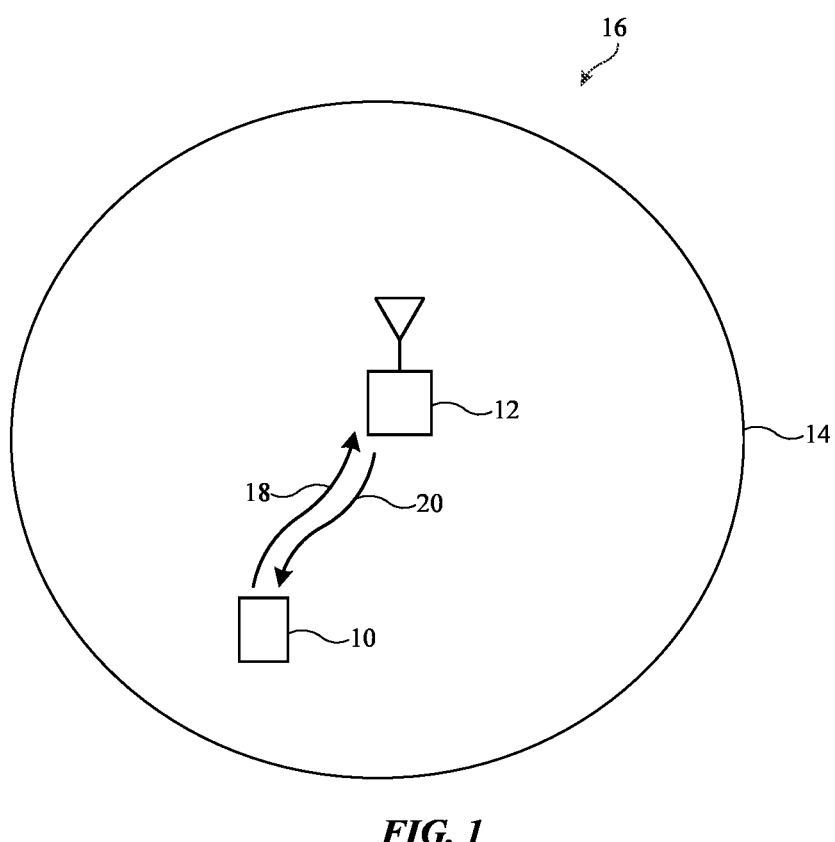
_FIG. 1_

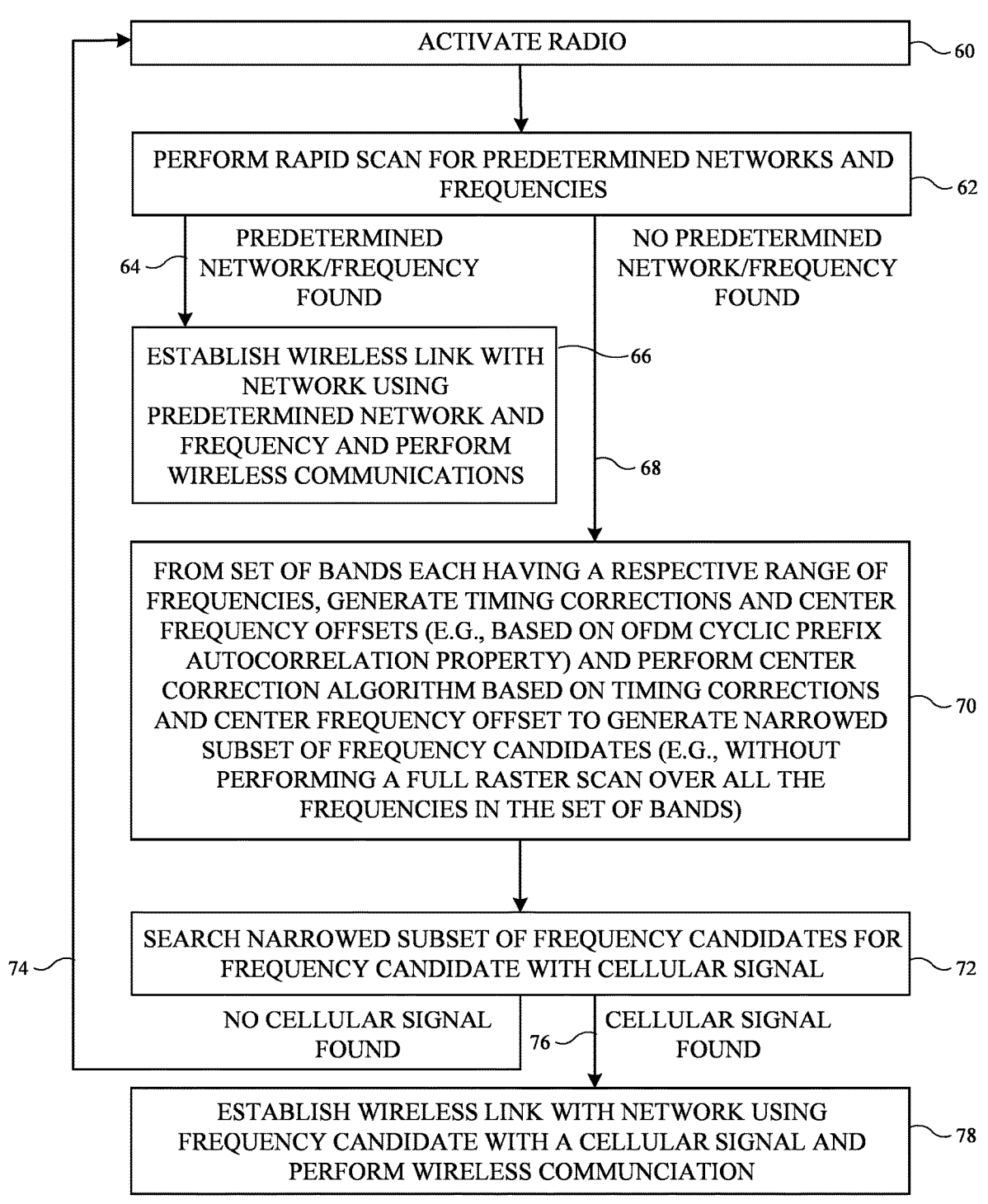

ACTIVATE RADIO ~60

PERFORM RAPID SCAN FOR PREDETERMINED NETWORKS AND FREQUENCIES ~62

64 ~ PREDETERMINED NETWORK/FREQUENCY FOUND

NO PREDETERMINED NETWORK/FREQUENCY FOUND

ESTABLISH WIRELESS LINK WITH NETWORK USING PREDETERMINED NETWORK AND FREQUENCY AND PERFORM WIRELESS COMMUNICATIONS ~66

~68

FROM SET OF BANDS EACH HAVING A RESPECTIVE RANGE OF FREQUENCIES, GENERATE TIMING CORRECTIONS AND CENTER FREQUENCY OFFSETS (E.G., BASED ON OFDM CYCLIC PREFIX AUTOCORRELATION PROPERTY) AND PERFORM CENTER CORRECTION ALGORITHM BASED ON TIMING CORRECTIONS AND CENTER FREQUENCY OFFSET TO GENERATE NARROWED SUBSET OF FREQUENCY CANDIDATES (E.G., WITHOUT PERFORMING A FULL RASTER SCAN OVER ALL THE FREQUENCIES IN THE SET OF BANDS) ~70

SEARCH NARROWED SUBSET OF FREQUENCY CANDIDATES FOR FREQUENCY CANDIDATE WITH CELLULAR SIGNAL ~72

74 ~

NO CELLULAR SIGNAL FOUND

76 ~ CELLULAR SIGNAL FOUND

ESTABLISH WIRELESS LINK WITH NETWORK USING FREQUENCY CANDIDATE WITH A CELLULAR SIGNAL AND PERFORM WIRELESS COMMUNCIATION ~78

*FIG. 3*

ELECTRONIC DEVICES WITH FREQUENCY SCAN ACCELERATION

This application claims the benefit of U.S. Provisional Patent Application No. 63/248,200, filed Sep. 24, 2021, which is hereby incorporated by reference herein in its entirety.

FIELD

This disclosure relates generally to wireless communications, including wireless communications performed by user equipment devices.

BACKGROUND

Communications systems often include user equipment and wireless base stations. The wireless base stations have corresponding coverage areas. When the user equipment is located within a coverage area, radio-frequency signals are exchanged between the user equipment and a wireless base station to convey wireless data.

In practice, there arise situations where the user equipment needs to search for a wireless base station with which to establish a wireless link. If care is not taken, it can take an excessive amount of time for a user equipment device to search for and find a wireless base station to connect to.

SUMMARY

A communications network may include a wireless base station and a user equipment (UE) device. When a radio on the UE device boots up, the radio may search for downlink signals transmitted by the wireless base station. The UE device may generate a narrow set of candidate frequencies over which to search for the downlink signals by leveraging a cyclic prefix autocorrelation property of the downlink signals. Each candidate frequency may have a corresponding center frequency offset (CFO) and symbol boundary timing correction that is used when searching over the narrow set of candidate frequencies.

To generate the narrow set of candidate frequencies, control circuitry may generate autocorrelated signals from baseband-shifted input signals over a set of different center frequencies and bandwidths. The control circuitry may divide the autocorrelated signals into symbols and may generate a set of long cyclic prefix hypotheses. The control circuitry may coherently sum the symbols in each of the long cyclic prefix hypotheses to generate a set of coherent sums. The control circuitry may perform peak detection on the long cyclic prefix hypothesis having the highest sum value. The control circuitry may identify the symbol boundary timing correction based on the sample number corresponding to the peak. The control circuitry may identify the CFO from the peak value. Searching over the narrow set of candidate frequencies may be significantly faster than performing a full raster scan over all frequencies supported by the radio.

An aspect of the disclosure an electronic device. The electronic device can include one or more antennas. The electronic device can include a radio configured to receive radio-frequency signals using the one or more antennas upon boot up of the radio. The electronic device can include one or more processors configured to generate an autocorrelation metric based on the radio-frequency signals, the radio being configured to search for a wireless base station based on the autocorrelation metric.

An aspect of the disclosure provides a method of operating an electronic device to detect a wireless base station for establishing a communication link with a wireless base station. The method can include at a radio, receiving input signals via one or more antennas. The method can include with one or more processors, generating an autocorrelation signal by autocorrelating samples of the input signals in a time domain. The method can include with the one or more processors, generating a set of cyclic prefix hypotheses based on the autocorrelation signal. The method can include with the one or more processors, generating a set of coherent sums based on the set of cyclic prefix hypotheses. The method can include with the one or more processors, generating a set of frequency candidates based on the set of coherent sums. The method can include with the radio, receiving radio-frequency signals over the set of frequency candidates and searching for the wireless base station based on the radio-frequency signals received over the set of frequency candidates.

An aspect of the disclosure provides a method of operating an electronic device. The method can include receiving, over one or more antennas, input signals upon boot up of a radio. The method can include with one or more processors, autocorrelating samples in the input signals to generate autocorrelated signals. The method can include with the one or more processors, generating a symbol boundary timing correction based on the autocorrelated signals. The method can include with the radio, receiving radio-frequency signals over the one or more antennas. The method can include with the radio, modifying at least some of the received radio-frequency signals using the symbol boundary timing correction. The method can include with the radio, searching for a downlink signal transmitted by a wireless base station in the received radio-frequency signals modified using the symbol boundary timing correction.

BRIEF DESCRIPTION OF THE DRAWINGS

FIG. 1 is a diagram of an illustrative communications network having a user equipment device and a wireless base station in accordance with some embodiments.

FIG. 3 is a flow chart of illustrative operations involved in using a user equipment device to search for and connect to a wireless base station upon activation of a radio in accordance with some embodiments.

DETAILED DESCRIPTION

Figure 2:
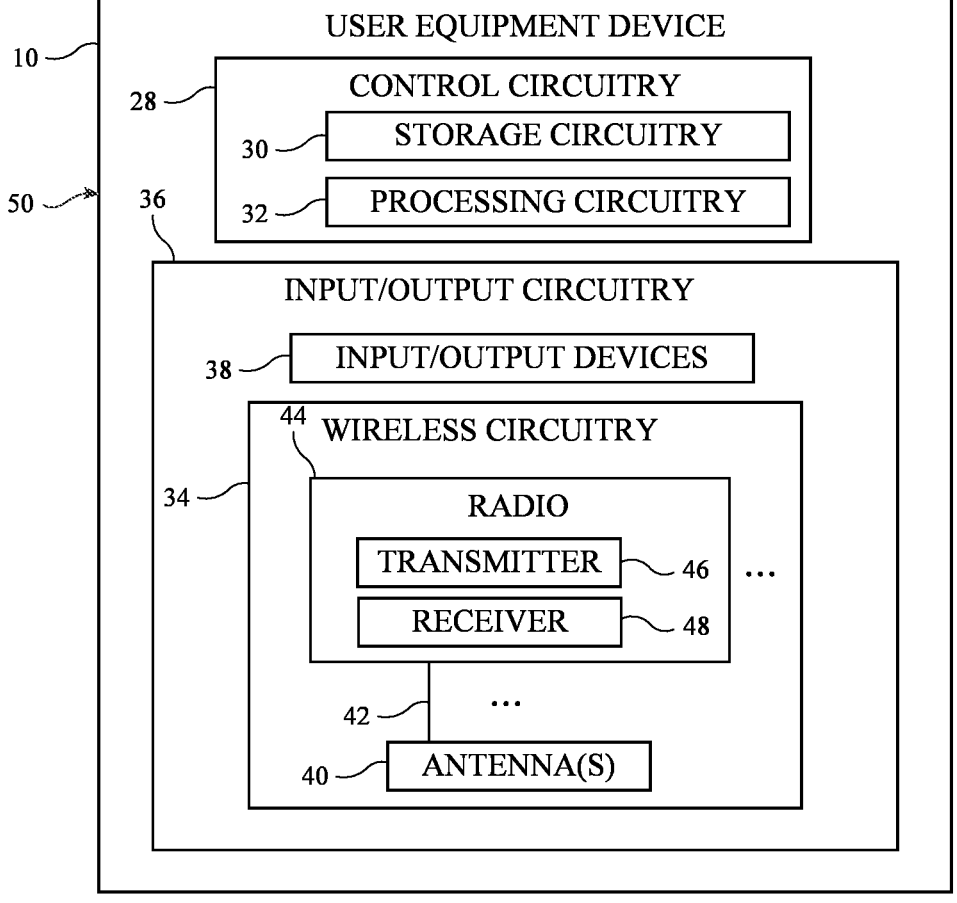
FIG. 2 is a block diagram of an illustrative user equipment device in accordance with some embodiments.

FIG. 1 is a schematic diagram of an illustrative communications system 16 (sometimes referred to herein as communications network 16) for conveying wireless data between communications terminals. Communications system 16 may include network nodes (e.g., communications terminals). The network nodes may include user equipment (UE) such as one or more UE devices 10. The network nodes may also include external communications equipment (e.g., communications equipment other than UE devices 10) such as wireless base station 12. Implementations in which the external communications equipment is a wireless base station are described herein as examples. In general, wireless base station 12 may be another UE device such as device 10, a wireless access point, or any other desired communications equipment. UE device 10 and wireless base station 12 may communicate with each other using a wireless communication link. To support the wireless communications link, UE device 10 may transmit radio-frequency signals 18 to wireless base station 12 in an uplink (UL) direction and/or wireless base station 12 may transmit radio-frequency signals 18 to UE device 10 in a downlink (DL) direction. Radio-frequency signals 18 may therefore sometimes be referred to herein as UL signals 18 and radio-frequency signals 20 may sometimes be referred to herein as DL signals.

Communications system 16 may form a part of a larger communications network that includes network nodes coupled to wireless base station 12 via wired and/or wireless links. The larger communications network may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. The larger communications network may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE device 10 may send data to and/or may receive data from other nodes or terminals in the larger communications network via wireless base station 12 (e.g., wireless base station 12 may serve as an interface between UE device 10 and the rest of the larger communications network). Some or all of the communications network may, if desired, be operated by a corresponding network operator or service provider.

Wireless base station 12 may include one or more antennas that provide wireless coverage for UE devices located within a corresponding geographic area or region such as cell 14. The size of cell 14 may correspond to the maximum transmit power level of wireless base station 12 and the over-the-air attenuation characteristics for radio-frequency signals conveyed by wireless base station 12, for example. When UE device 10 is located within cell 14, UE device 10 may communicate with wireless base station 12 over a wireless link (e.g., using UL signals 18 and DL signals 20.

FIG. 2 is a block diagram of an illustrative UE device 10. UE device 10 may be an electronic device and may therefore sometimes be referred to herein simply as device 10. UE device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in FIG. 2, UE device 10 may include components located on or within an electronic device housing such as housing 50. Housing 50, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 50 may be formed from dielectric or other low-conductivity material (e.g., glass, ceramic, plastic, sapphire, etc.). In other situations, housing 50 or at least some of the structures that make up housing 50 may be formed from metal elements.

UE device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 30 may include storage that is integrated within UE device 10 and/or removable storage media.

Control circuitry 28 may include processing circuitry such as processing circuitry 32. Processing circuitry 32 may be used to control the operation of UE device 10. Processing circuitry 32 may include on one or more processors, microprocessors, microcontrollers, digital signal processors, host processors, baseband processor integrated circuits, application specific integrated circuits, central processing units (CPUs), graphics processing units (GPUs), etc. Control circuitry 28 may be configured to perform operations in UE device 10 using hardware (e.g., dedicated hardware or circuitry), firmware, and/or software. Software code for performing operations in UE device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on UE device 10 such as satellite navigation applications, internet browsing applications, voice-over-internet-protocol (VOIP) telephone call applications, email applications, media playback applications, operating system functions, etc. To support interactions with external communications equipment, control circuitry 28 may be used in implementing communications protocols. Communications protocols that may be implemented using control circuitry 28 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol.

UE device 10 may include input-output circuitry 36. Input-output circuitry 36 may include input-output devices 38. Input-output devices 38 may be used to allow data to be supplied to UE device 10 and to allow data to be provided from UE device 10 to external devices. Input-output devices 38 may include user interface devices, data port devices, and other input-output components. For example, input-output devices 38 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 38 may be peripherals that are coupled to a main processing unit or other portion of UE device 10 via a wired or wireless link).

Input-output circuitry 36 may include wireless circuitry 34 to support wireless communications. Wireless circuitry 34 (sometimes referred to herein as wireless communications circuitry 34) may include one or more antennas 40. Wireless circuitry 34 may also include one or more radios 44. Radio 44 may include circuitry that operates on signals at baseband frequencies (e.g., baseband circuitry) and radio-frequency transceiver circuitry such as one or more radio-frequency transmitters 46 and one or more radio-frequency receivers 48. Transmitter 46 may include signal generator circuitry, modulation circuitry, mixer circuitry for upconverting signals from baseband frequencies to intermediate frequencies and/or radio frequencies, amplifier circuitry such as one or more power amplifiers, digital-to-analog converter (DAC) circuitry, control paths, power supply paths, switching circuitry, filter circuitry, and/or any other circuitry for transmitting radio-frequency signals using antenna(s) 40. Receiver 48 may include demodulation circuitry, mixer circuitry for downconverting signals from intermediate frequencies and/or radio frequencies to baseband frequencies, amplifier circuitry (e.g., one or more low-noise amplifiers (LNAs)), analog-to-digital converter (ADC) circuitry, control paths, power supply paths, signal paths, switching circuitry, filter circuitry, and/or any other circuitry for receiving radio-frequency signals using antenna(s) 40. The components of radio 44 may be mounted onto a single substrate or integrated into a single integrated circuit, chip, package, or system-on-chip (SOC) or may be distributed between multiple substrates, integrated circuits, chips, packages, or SOCs.

Antenna(s) 40 may be formed using any desired antenna structures for conveying radio-frequency signals. For example, antenna(s) 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 40 over time. If desired, two or more of antennas 40 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given pointing direction.

The term "convey radio-frequency signals" as used herein means the transmission and/or reception of the radio-frequency signals (e.g., for performing unidirectional and/or bidirectional wireless communications with external wireless communications equipment). Antenna(s) 40 may transmit the radio-frequency signals by radiating the radio-frequency signals into free space (or to free space through intervening device structures such as a dielectric cover layer). Antenna(s) 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Each radio 44 may be coupled to one or more antennas 40 over one or more radio-frequency transmission lines 42. Radio-frequency transmission lines 42 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 42 may be integrated into rigid and/or flexible printed circuit boards if desired. One or more radio-frequency lines 42 may be shared between multiple radios 44 if desired. Radio-frequency front end (RFFE) modules may be interposed on one or more radio-frequency transmission lines 42. The radio-frequency front end modules may include substrates, integrated circuits, chips, or packages that are separate from radios 44 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 42.

Radio 44 may transmit and/or receive radio-frequency signals within corresponding frequency bands at radio frequencies (sometimes referred to herein as communications bands or simply as "bands"). The frequency bands handled by radio 44 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

Transmitter 46 may transmit radio-frequency signals over antenna(s) 40 when transmitter 46 is active (e.g., enabled). Transmitter 46 does not transmit radio-frequency signals over antenna(s) 40 when transmitter 46 is inactive (e.g., disabled or not actively transmitting sign). Similarly, receiver 48 may receive radio-frequency signals over antenna(s) 40 when receiver 48 is active (e.g., enabled). Receiver 48 does not receive radio-frequency signals over antenna(s) 40 when receiver 48 is inactive (e.g., disabled). Control circuitry 28 may control transmitter 46 to be active or inactive at any given time. Control circuitry 28 may also control receiver 48 to be active or inactive at any given time. Control circuitry 28 may activate or deactivate transmitter 46 and/or receiver 48 at different times as dictated by a communications protocol governing radio 44 and/or based on instructions provided by a user and/or from other software running on control circuitry 28, for example. Control circuitry 28 may configure transmitter 46 to be inactive by powering off transmitter 46, by providing control signals to switching circuitry on power supply or enable lines for transmitter 46, by providing control signals to control circuitry on transmitter 46, and/or by providing control signals to switching circuitry within transmitter 46, for example. When transmitter 46 is inactive, some or all of transmitter 46 may be inactive (e.g., disabled or powered off) or transmitter 46 may remain powered on but without transmitting radio-frequency signals over antenna(s) 40. Similarly, control circuitry 28 may configure receiver 48 to be inactive by powering off receiver 48, by providing control signals to switching circuitry on power supply or enable lines for receiver 48, by providing control signals to control circuitry on receiver 48, and/or by providing control signals to switching circuitry within receiver 48, for example. When receiver 48 is inactive, some or all of receiver 48 may be disabled (e.g., powered off) or receiver 48 may remain powered on but without actively receiving radio-frequency signals incident upon antenna(s) 40. Transmitter 46 and receiver 48 may consume more power on UE device 10 when active than when inactive (e.g., a battery on UE device 10 may drain more rapidly while transmitter 46 and receiver 48 are active than while transmitter 46 or receiver 48 are inactive).

The example of FIG. 2 is merely illustrative. While control circuitry 28 is shown separately from wireless circuitry 34 in the example of FIG. 1 for the sake of clarity, wireless circuitry 34 may include processing circuitry (e.g., one or more processors) that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband circuitry (e.g., one or more baseband processors), digital control circuitry, analog control circuitry, and/or other control circuitry that forms part of radio 44. The baseband circuitry may, for example, access a communication protocol stack on control circuitry 28 (e.g., storage circuitry 30) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 34.

When radio 44 (e.g., a cellular modem in radio 44) boots up, UE device 10 may attempt to connect (attach) to a wireless network. Radio 44 may search for downlink signals 20 transmitted by a wireless base station such as wireless base station 12 (FIG. 1) to establish a connection with the rest of the network. Radio 44 may boot up when UE device 10 is turned on (powered on), when UE device 10 is brought out of airplane (flight) mode, or when UE device 10 enters cell 14 after being outside of the coverage area (e.g., during an out of service (OOS) recovery period), as examples.

Generally, UE device 10 may have no prior knowledge of the wireless base station 12 and the frequencies of DL signals 20 at its location upon radio boot up. UE device 10 may therefore scan radio 44 (receiver 48) over all possible frequencies supported by the radio until DL signals 20 are found. This may, for example, involve receiver 48 receiving radio-frequency signals at each frequency in each band supported by the radio in series, measuring the received radio-frequency signals for a particular radio-frequency performance metric or receipt of a particular type of signal (e.g., a primary synchronization signal (PSS), a secondary synchronization signal (SSS), performing shape-matching techniques based on spectral-power-density, etc.) at each frequency before moving to the next frequency, and continuing to sweep over frequency until DL signals 20 are found and a connection can be established.

In practice, searching for wireless base station 12 (DL signals 20) in this way is very time consuming, can consume excessive processing resources, and can delay the amount of time before a user is able to use UE device 10 to interact with the network upon radio boot up. For example, for 4G LTE bands, synchronization signals channel raster at 100 kHz for all bands, which means that the carrier center frequency must be an integer multiple of 100 kHz (e.g., producing over 600 possible frequencies given a 600 MHz bandwidth configuration). For low frequency 5G bands, a global synchronization raster is defined for all frequencies as SSREF with a corresponding number GSCN, which produces even more possible frequencies than in the 4G LTE bands. In addition, these types of frequency scans are often based on time correlations with known synchronization signals (e.g., three PSS codes). However, the duration required to guarantee that PSS is captured in a correlation time window is relatively long (e.g., 5 ms and 20 ms per PSS occasion under 4G and 5G respectively) and several PSS repetitions may be needed to guarantee sufficient processing gain, thereby resulting in a very long frequency scan duration. In addition, power shape matching techniques require long periods of power spectral-density-aggregation for generating a satisfactory image shaping property in low signal-to-noise (SNR) ratio environments.

To minimize the amount of time required to find DL signals 20 for establishing a wireless communication link with wireless base station 12, radio 44 may narrow the set of potential candidate frequencies for the DL signals using the cyclic prefix (CP) autocorrelation property of orthogonal frequency division multiplexing (OFDM) that is present in 4G/5G signals. Narrowing the set of potential candidate frequencies may significantly reduce the scan duration for radio 44 after modem boot up. Radio 44 may, for example, perform symbol boundary timing correction and central frequency correction (carrier frequency offset (CFO) estimation) for the narrowed set of potential candidate frequencies based on the CP autocorrelation property.

FIG. 3 is a flow chart showing how UE device 10 may efficiently search for DL signals 20 and wireless base station 12 upon radio boot up (e.g., by leveraging the CP autocorrelation property of OFDM). At operation 60, UE device 10 may boot (e.g., activate, power on, etc.) radio 44. This may occur when UE device 10 exits an airplane (flight) operating mode, when UE device 10 transitions from being out-of-service to in-service (e.g., when UE device 10 moves within a cell 14), when UE device 10 is powered on or woken up, etc.

At operation 62, radio 44 may perform a rapid scan for predetermined networks and DL frequencies. As examples, radio 44 may attempt to utilize a recently-used carrier frequency (e.g., the last known carrier frequency), may attempt to use a home network carrier (e.g., HPLMN frequencies), may use a frequencies prime list (e.g., an internal UE list of frequencies with the highest probability to contain an available network), may use a frequency selected based on the GPS location of UE device 10 (e.g., using a map of self-location to known networks), may use a frequency identified by WLAN signals or other signals received at UE device 10, etc. This may allow radio 48 to bypass subsequent searching operations where possible (e.g., using frequencies and networks known to have a relatively high probability of success), thereby decreasing the time required to connect to the network.

If radio 44 is able to find one of these networks and frequencies, processing may proceed to operation 66 via path 64. At operation 66, radio 44 may use the predetermined network and frequency to establish a wireless link with the network (e.g., with wireless base station 12). This may involve, for example, registering and/or connecting UE device 10 to the network (e.g., entering a connected mode). UE device 10 and wireless base station 12 may thereafter perform wireless communications (e.g., to convey wireless data in the uplink and/or downlink direction). If radio 44 is unable to find a predetermined network and frequency at operation 62, processing may proceed from operation 62 to operation 70 via path 68.

At operation 70, radio 44 may process a set of bands each having respective frequency ranges. The set of bands may, for example, be all the bands supported by radio 44 (e.g., a list of supported cellular bands). Radio 44 may reduce the number of candidate frequencies (e.g., to a subset of frequencies) over which to perform subsequent searching for DL signals 20 and wireless base station 12 (e.g., without performing a full raster scan over all the frequencies of all the bands). The reduced set/subset may have substantially fewer frequency candidates than the set of all possible frequencies defined by the communications standard associated with DL signals 20 (e.g., LTE). This in turn reduces the scan duration relative to scenarios where the radio scans the entire frequency range of each of the bands in the set of bands. Radio 44 may perform these operations (e.g., narrowing the number of frequencies candidates on which the UE attempts to synchronize with a cell) based on the CP autocorrelation property of OFDM, for example. Each frequency candidate in the narrowed set of frequency candidates may have symbol boundary timing and a center frequency offsets that are generated based on the CP autocorrelation property. Center frequency may then be corrected using a correction center algorithm that uses as an input timing and a center frequency offset identified by the UE device based on the CP autocorrelation property of the signals. The output of this operation may be the short list (e.g., the narrowed subset) of frequency candidates to search for cells on.

At operation 72, radio 44 may search the narrowed set of frequency candidates for a frequency candidate having DL signals 20. Radio 44 may, for example, measure wireless performance metrics, detect predetermined signals such as synchronization signals, etc., at each of the frequency candidates in the narrowed set until DL signals 20 and wireless base station 12 are found. Since the narrowed subset has far fewer frequency candidates than the full set of bands, scanning over the narrowed subset may be substantially faster than performing a full raster scan over all frequencies in the set of bands. If no cellular signal is found in the narrowed set of frequency candidates, processing may loop back to operation 62 as shown by path 74 until a cellular signal is found. This is merely illustrative and, if desired, path 74 may loop back to operation 70.

If a cellular signal is found in the narrowed set of frequency candidates, processing may proceed from operation 72 to operation 78 via path 76. At operation 78, radio 44 may use the frequency candidate having the cellular signal to establish a wireless link with the network (e.g., with wireless base station 12). This may involve, for example, registering and/or connecting UE device 10 to the network (e.g., entering a connected mode). UE device 10 and wireless base station 12 may thereafter perform wireless communications (e.g., to convey wireless data in the uplink and/or downlink direction). In this way, UE device 10 may identify wireless base station 12 and the frequency of DL signals 20 in very little time upon activation of radio 44.

Figure 4:
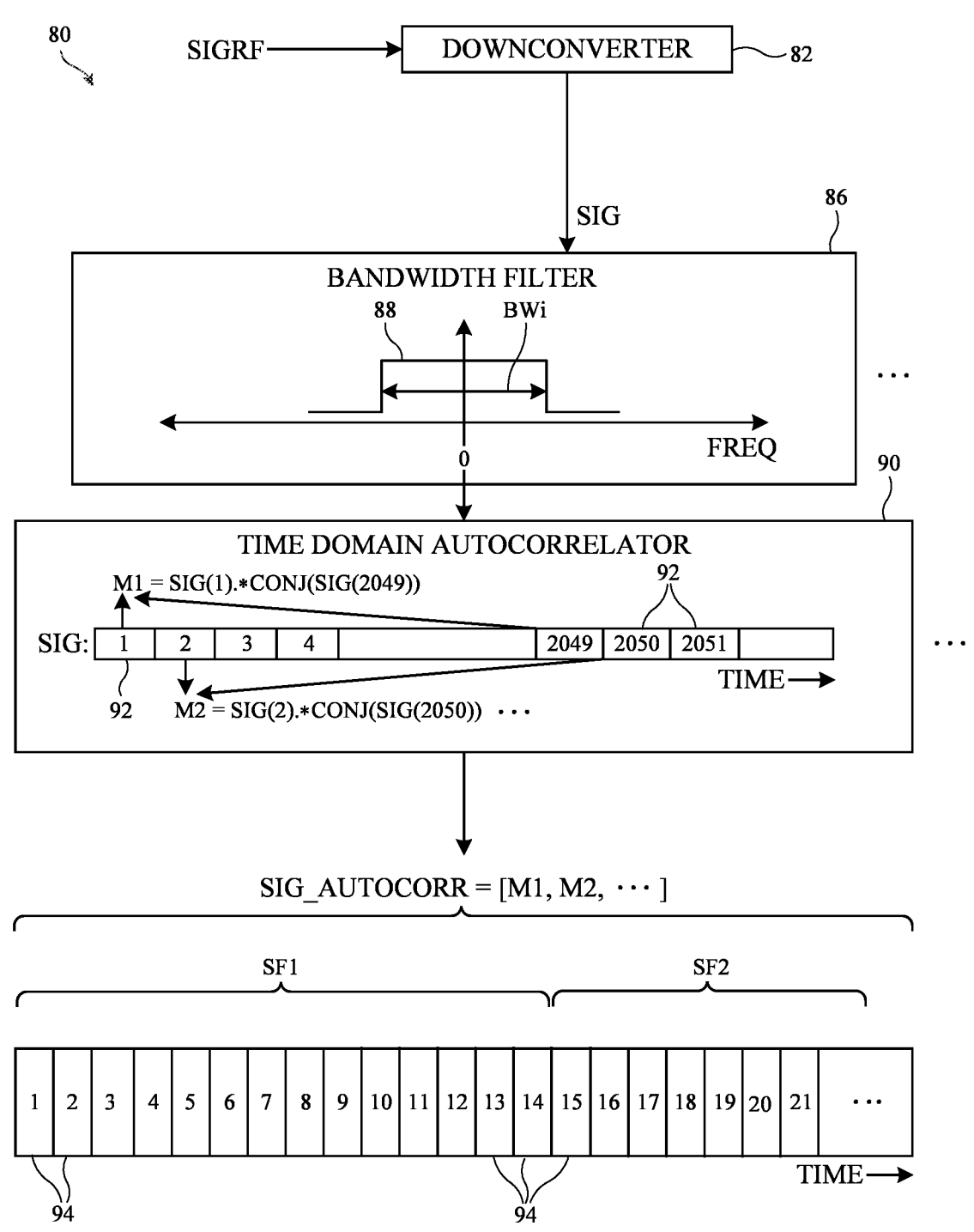
FIGS. 4 and 5 are block diagrams of illustrative circuitry that may efficiently search for and connect to a wireless base station based on a cyclic prefix autocorrelation property in accordance with some embodiments.
Figure 5:
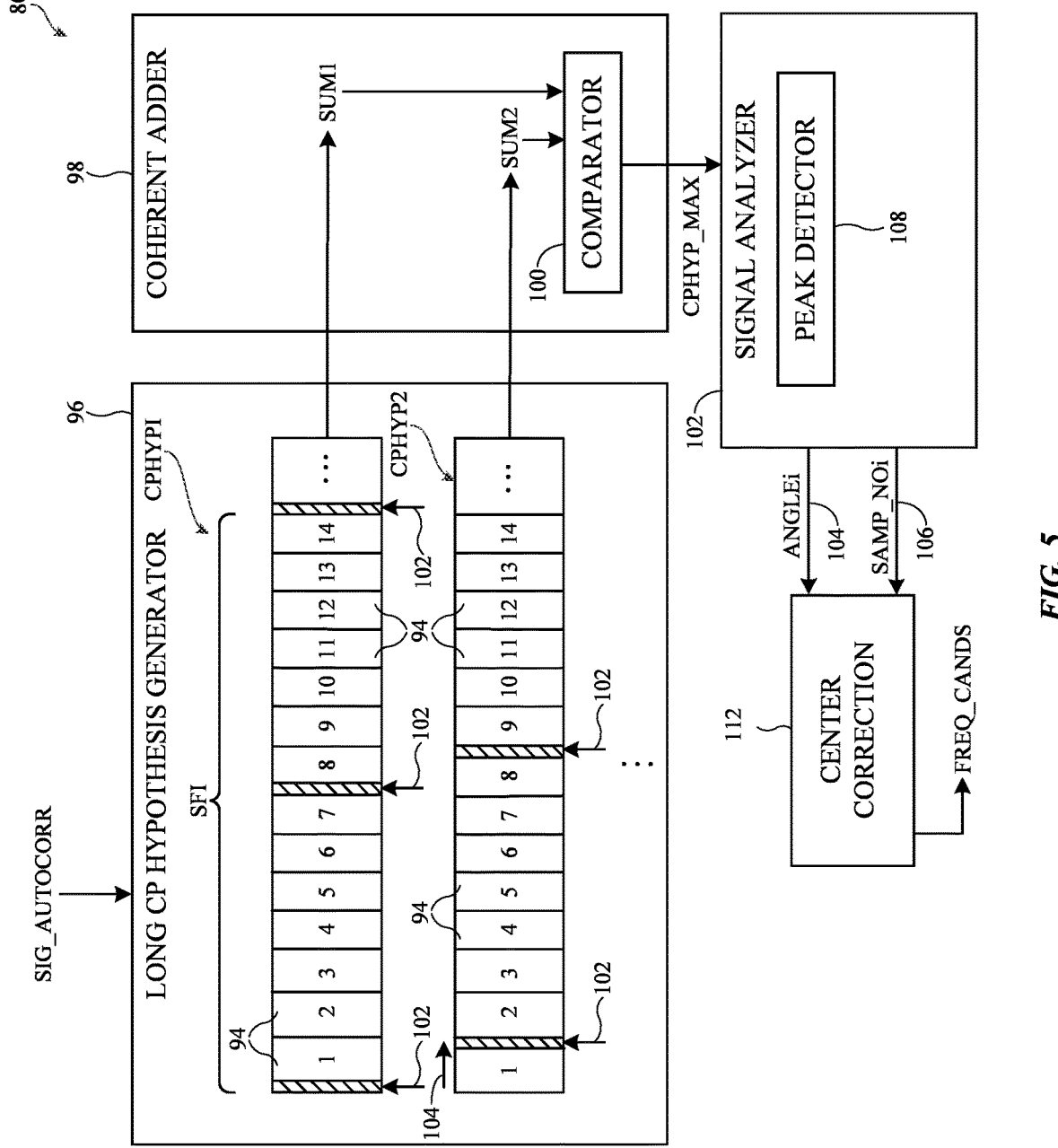

FIGS. 4 and 5 are block diagrams showing how radio 44 may generate a narrow set of frequency candidates having symbol-boundary timing and a center frequency that has been correction based on the CP autocorrelation property, for use in searching for wireless base station 72 (e.g., while processing operation 72 of FIG. 3). The components (blocks) of FIGS. 4 and 5 may generate the narrowed set of frequency candidates while radio 44 processes operation 70 of FIG. 3.

As shown in FIG. 4, radio 44 (e.g., receiver 48 of FIG. 2) may include frequency candidate selection circuitry 80. Circuitry 80 may include a downconverter such as down-converter 82, a bandwidth filter such as bandwidth filter 86, and a time domain autocorrelator such as autocorrelator 90. The input of downconverter 82 may receive input signal SIGRF (e.g., a radio-frequency signal received by antenna (s) 40 of FIG. 2). The output of downconverter 82 may be coupled to the input of bandwidth filter 86. Downconverter 82 may provide a baseband input signal SIG to bandwidth filter 86. The output of bandwidth filter 86 may be coupled to the input of autocorrelator 90. Autocorrelator 90 may output an autocorrelated signal SIG_AUTOCORR.

As shown in FIG. 5, circuitry 80 may also include a long CP hypothesis generator 96, adder circuitry such as coherent adder 98, signal analysis circuitry such as signal analyzer 102, and center frequency correction circuitry such as center correction block 112. The input of long CP hypothesis generator 96 may be coupled to the output of autocorrelator 90 (FIG. 4) and may receive autocorrelated signal SIG_AU-TOCORR from autocorrelator 90. The output of long CP hypothesis generator may be coupled to the input of coher-ent adder 98. Coherent adder 98 may include comparison circuitry such as comparator 100. The output of coherent adder 98 (e.g., comparator 100) may be coupled to the input of signal analyzer 102. Signal analyzer 102 may include peak detection circuitry such as peak detector 108. Signal analyzer 102 may have a first output coupled to center correction block 112 over path 104 and may have a second output coupled to center correction block 112 over path 106. Center correction block 112 may output narrowed set of frequency candidates FREQ_CANDS. Each frequency can-didate in narrowed set of frequency candidates FREQ_CANDS may have corrected symbol-boundary tim-ing and a corrected center frequency. The elements (blocks) of circuitry 80 (e.g., downconverter 82, bandwidth filter 86, autocorrelator 90, long CP hypothesis generator 96, coherent adder 98, signal analyzer 102, and/or center correction block corrector 112) may be implemented using hardware com-ponents (e.g., digital and/or analog logic) and/or using software code executed by one or more processors (e.g., one or more ASICs, CPUs, FPGAs, etc.).

Figure 6:
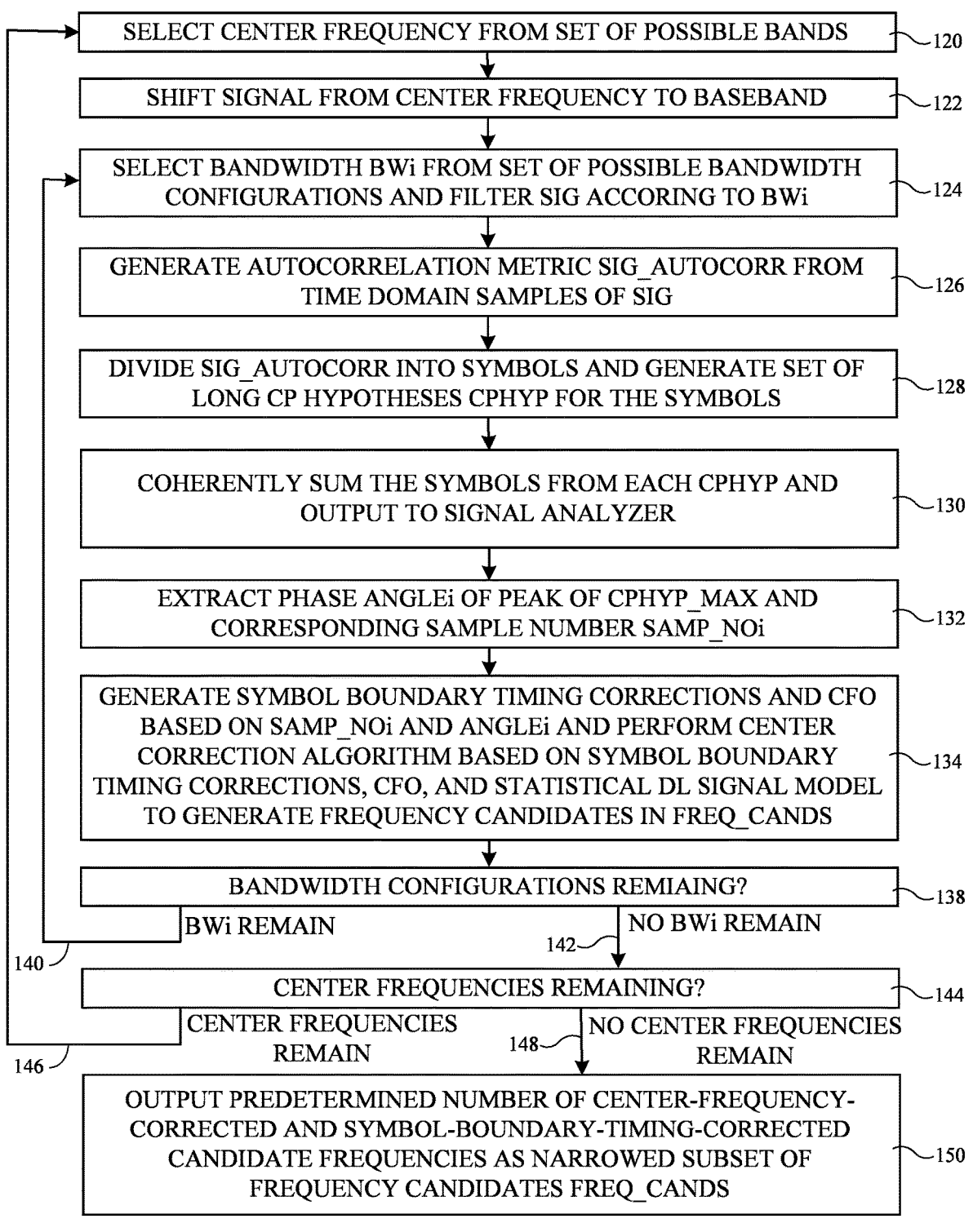
FIG. 6 is a flow chart of illustrative operations involved in identifying a set of timing and frequency-corrected candidate frequencies based on a cyclic prefix autocorrelation property for use in efficiently searching for a wireless base station in accordance with some embodiments.

FIG. 6 is a flow chart of illustrative operations that may be performed by radio 44 to generate narrowed set of frequency candidates FREQ_CANDS using circuitry 80 of FIGS. 4 and 5. The operations of FIG. 6 may be performed while receiving input signal SIGRF (e.g., while performing operation 70 of FIG. 3).

At operation 120, radio 44 may select a center frequency from the set of bands (e.g., the set of all bands handled by radio 44). This frequency may sometimes be referred to herein as a candidate. Radio 44 may, for example, tune one or more tuning components in receiver 48 and/or antenna(s) 40 so the radio receives radio-frequency signals at the selected center frequency and provides the corresponding input signal SIGRF to downconverter 82 at the selected center frequency.

At operation 122, downconverter 82 (FIG. 4) may shift (downconvert) input signal SIGRF from the selected center frequency to baseband to produce baseband input signal SIG (referred to herein simply as input signal SIG). DL signals 20 transmitted by wireless base station 12 may have a bandwidth (e.g., a bandwidth configuration) determined by the wireless base station and governed by the communica-tions protocol of DL signals 20 (e.g., a 4G or 5G protocol). In general, radio 44 has no prior knowledge of the band-width configuration being used by DL signals 20. Radio 44 therefore may search the input signal SIG over different bandwidth configurations to identify candidate frequencies for the narrowed set of candidate frequencies.

At operation 124, bandwidth filter 86 (FIG. 4) may apply a selected bandwidth filter 88 (e.g., a passband filter) to input signal SIG to filter the input signal to a selected bandwidth configuration having a selected bandwidth BWi (e.g., a first bandwidth configuration in which input signal SIG is at a first bandwidth BW1, a second bandwidth configuration in which input signal SIG is at a second bandwidth BW2, etc.). In examples where DL signals 20 are LTE signals, the LTE protocol includes six different bandwidth configurations and the selected bandwidth configuration may be one of these six bandwidth configurations (e.g., 1.4 MHz, 3 MHz, 5 MHz, 10 MHz, 15 MHz, and 20 MHz bandwidths). Subsequent processing may be performed on input signal SIG as filtered to exhibit the selected bandwidth. Bandwidth filter 86 may pass the filtered signal to autocorrelator 90.

At operation 126, autocorrelator 90 (FIG. 4) may generate autocorrelated signal SIG_AUTOCORR (sometimes referred to herein as autocorrelation metric SIG_AUTO-CORR or autocorrelation metric signal SIG_AUTOCORR) based on samples of input signal SIG (e.g., as filtered by bandwidth filter 86) in the time domain. For example, as shown in FIG. 4, input signal SIG includes a series of sequential samples 92. Autocorrelator 90 may generate autocorrelated signal SIG_AUTOCORR by performing an autocorrelation on samples 92 (e.g., by autocorrelating samples 92). The autocorrelation may involve multiplying each sample 92 in input signal SIG by a corresponding later sample from input signal SIG that is separated in time by length NFFT from that sample. Autocorrelated signal SIG_AUTOCORR may be represented by a vector of mul-tiplied values M (e.g., M1, M2, etc.), where each multiplied value M is generated by the respective multiplication (auto-correlation) of samples 92 from input signal SIG.

In the example of FIG. 4, length NFFT is 2048 samples (e.g., the FFT size is 2048). This is merely illustrative and, in general, length NFFT (e.g., the FFT size) may be other values. Autocorrelator 90 may generate autocorrelated sig-nal SIG_AUTOCORR by generating (e.g., calculating, com-puting, producing, etc.) multiplied values M. Multiplied values M may include, for example, multiplied value M1 generated using the first and 2049$^{th}$ samples 92 from input signal 92 using the equation M1=SIG(1).*CONJ(SIG (2049)) and multiplied value M2 generated using the second and 2050$^{th}$ samples 92 from input signal 92 using the equation M2=SIG(2).*CONJ(SIG(2050)). In these equa-tions, SIG(1) is the first sample 92, SIG(2) is the second sample 92, SIG(2049) is the 2049$^{th}$ sample 92, SIG(2050) is the 2050$^{th}$ sample 92, ".*" is the dot product operator, and CONJ( ) is the conjugate operator. This process may be repeated for each sample 92 from input signal 92, which may be as long as 150,000 samples or more (e.g., around 5 ms in the time domain), to produce a full vector of multiplied values M as autocorrelated signal SIG_AUTOCORR.

At operation 128, circuitry 80 may divide autocorrelated signal SIG_AUTOCORR into a series of symbols 94 (in the time domain). As shown in FIG. 4, sets of symbols 94 may be grouped into corresponding subframes SF (e.g., a first subframe SF1 that includes the first fourteen consecutive symbols 94, a second subframe SF2 that includes the second fourteen consecutive symbols 94, etc.). When length NFFT is equal to 2048, each symbol 94 may include 2048 samples 92 plus a cyclic prefix (CP) prepended to the beginning of the symbol that includes a fixed number of samples (e.g., 144 samples). The CP of each symbol may be a repetition of the samples at the end of that symbol. In addition, there may be an extended CP prepended to the beginning of every half subframe (e.g., every seven symbols 94). The extended CP may include more samples than the CP on the other symbols (e.g., 160 samples).

In general, radio 44 has no knowledge of the actual frequency and timing of potential wireless signals received at the selected center frequency and with the selected bandwidth (e.g., DL signals 20 of FIG. 1). Organizing autocorrelated signal SIG_AUTOCORR in this way may follow the sample/symbol/subframe/frame structure of the communications protocol governing the potential wireless signals. As such, radio 44 has no knowledge of the actual time domain location of the CP at the beginning of each symbol or the time domain location of the extended CP in the received signal. However, multiplying each sample in the input signal by another sample separated by length NFFT (e.g., autocorrelating samples at operation 126) will produce a larger amplitude (e.g., a large multiplication value M) when the sample is actually a CP sample than when the sample is a non-CP sample (e.g., because both samples in the multiplication will be CP samples). As such, autocorrelated signal SIG_AUTOCORR may be used to identify where in time any potential CP samples are located in the input signal, which may be used to identify the timing for the input signal when the input signal is from an actual DL signal 20.

Radio 44 may still need to identify the time location of the extended CPs in the autocorrelated signals. Since extended CPs occur regularly in the frame structure of the actual DL signals, radio 44 may generate a relatively small fixed set of hypotheses for where extended CP is located in the input signal. In examples where an extended CP occurs every seven symbols 94, radio 44 need only generate seven hypotheses for where the extended CP may be located. As shown in FIG. 5, long (extended) CP hypothesis generator 96 may generate a set of long CP hypotheses CPHYP using autocorrelated signal SIG_AUTOCORR (e.g., after the signal has been divided into symbols 94). The example of FIG. 5 shows the first two long CP hypotheses CPHYP1 and CPHYP2. In long CP hypothesis CPHYP1, extended CPs 102 are located before every seventh symbol 94 beginning with the first symbol 94 from autocorrelated signal SIG_AUTOCORR. In long CP hypothesis CPHYP2, extended CPs 102 are located before every seventh symbol 94 beginning with the second symbol 94 from autocorrelated signal SIG_AUTOCORR. Each long CP hypothesis generated by long CP hypothesis generator 96 may include long CPs that are shifted one symbol with respect to the previous hypothesis, as shown by arrow 104. In this example, long CP hypothesis generator 96 may generate seven long CP hypotheses CPHYP.

At operation 130 of FIG. 6, coherent adder 98 (FIG. 5) may coherently add the symbols 94 from each of the long CP hypotheses together to generate (e.g., produce, calculate, compute, etc.) a set of sum values SUM. For example, coherent adder 98 may coherently add the samples 94 from long CP hypothesis CPHYP1 to generate a first (coherent) sum value SUM1, may coherently add the samples 94 from long CP hypothesis CPHYP2 to generate a second (coherent) sum value SUM2, etc. The coherent addition may include the addition of symbols as complex numbers to account for both amplitude and phase rather than simply adding real amplitude values, for example (e.g., where each symbol position is added to the next symbol position separated by length NFFT). Radio 44 may select the long CP hypothesis CPHYP that produced the highest magnitude sum value SUM for further processing at signal analyzer 102. For example, comparator 100 on coherent adder 98 may identify the sum value SUM having the highest magnitude and may forward the corresponding long CP hypothesis CPHYP (denoted as CPHYP_MAX) from long CP hypothesis generator 96 to signal analyzer 102 for further processing. Long CP hypothesis CPHYP_MAX may, for example, be in the format of coherently summed symbols/samples (e.g., as produced by coherent adder 98). There may be a peak in the coherently summed signal at the sample number where the CP is located in the input signal. This is merely illustrative and, if desired, coherent adder 98 may output each of the long CP hypotheses (coherent sums) to signal analyzer 102 for further processing.

At operation 132, signal analyzer 102 may identify an amplitude peak in long CP hypotheses CPHYP (e.g., using peak detector 108, which outputs the peak of the coherent sum). The amplitude peak may, for example, be produced by the addition of CP values and extended CP values that are in the temporal positions (e.g., sample positions) specified by the hypothesis. Signal analyzer 102 may identify the sample number SAMP_NOi corresponding to the amplitude peak (e.g., the sample number at which the amplitude peaks, indicating the presence of CP values at that temporal position). Signal analyzer 102 may pass the identified sample number SAMP_NOi to center correction block 112 over path 106. Signal analyzer 102 may also identify the phase ANGLEi corresponding to the amplitude peak. Signal analyzer 102 may pass the identified phase ANGLEi to center correction block 112 over path 104. Signal analyzer 102 may pass the identified sample number SAMP_NOi and phase ANGLEi for each of the CP hypotheses to center correction block 112 or may pass the sample number and phase for only the CP hypothesis having the highest peak to center correction block 112.

At operation 134, center correction block 112 may perform symbol boundary timing correction based on sample number SAMP_NOi. For example, because sample number SAMP_NOi corresponds to the sample position of the CP in the input signal, center correction block 112 may have knowledge, based on sample number SAMP_NOi, of where each symbol in the input signal starts and begins (e.g., because each symbol has a CP at the beginning of the symbol and every seventh symbol has an extended CP 102). Center correction block 112 may identify symbol boundary timing corrections (e.g., timing offsets) for correcting the symbol boundary timing of the input signal at the selected bandwidth and center frequency.

Center correction block 112 may identify a center frequency offset (CFO) for the signal peak (e.g., based on phase ANGLEi). Center correction block 112 may also include components that perform a center correction algorithm based on the CFO and the symbol boundary timing corrections. The center correction algorithm may use the CFO, the symbol boundary timing corrections, and a statistical model of the DL signal to correct the center frequency of the peak to reduce the total number of frequency candidates. Center correction block 112 may store the symbol boundary timing corrections, the CFO, the corrected center frequencies, and the corresponding selected bandwidth BWi (e.g., as selected at operation 124) as a frequency candidate for further processing.

At operation 138, radio 44 may determine if bandwidth configurations remain in the set of bandwidth configurations for performing operations 126-136 on the input signal at the selected center frequency. If bandwidths BWi remain, processing may loop back to operation 124 via path 140, and center correction block 112 may store additional frequency candidates for additional bandwidth configurations. If no bandwidths BWi remain, processing may proceed to operation 144 via path 142.

At operation 144, radio 44 may determine if center frequencies remain in the set of bands handled by radio 44 for performing operations 126-136. If center frequencies remain, processing may loop back to operation 120 via path 120, and center correction block 112 may store additional frequency candidates for additional center frequencies and bandwidth configurations. If no center frequencies remain, processing may proceed to operation 150 via path 148.

At operation 150, center correction block 112 may output a predetermined number of the stored frequency candidates as the narrowed set of frequency candidates FREQ_CANDS. If desired, center correction block 112 may only retain the candidate frequency from the bandwidth configuration that resulted in the highest peak amplitude value (e.g., as detected at operation 132) during each iteration/loop of operations 120-144. In other words, the narrowed set of frequency candidates FREQ_CAND may include center frequencies (e.g., including center frequency corrections as identified at operation 134) and corresponding symbol boundary timing corrections for the best-performing bandwidth configuration for that center frequency.

The example of FIG. 6 is merely illustrative. If desired, operation 134 may be performed after operation 138 and only on the long CP hypothesis CPHYP from the bandwidth configuration that generated the highest peak amplitude, whereas the other bandwidth configurations for each center frequency are discarded. This may, for example, further reduce the processing time required to generate the narrowed set of frequency candidates FREQ_CANDS. If desired, frequency candidates may be generated for different bandwidth configurations and/or different center frequencies in parallel.

Radio 44 may subsequently search the narrowed set of frequency candidates FREQ_CANDS output by center correction block 112 for DL signals 20 and wireless base station 20 (e.g., while processing operation 72 of FIG. 3). When receiving signals at each of the frequency candidates, radio 44 may apply the symbol timing correction and the center frequency correction identified for that frequency candidate (e.g., at operations 134 of FIG. 6) to the received signals. The reception may occur without inter-carrier interference (ICI), for example. This may allow radio 44 to properly identify synchronization signals such as PSS signals in the received signals that are then used to detect that DL signals 20 and wireless base station 12 have been found, for example.

Once DL signals 20 and wireless base station 12 have been found from the narrowed set of frequency candidates FREQ_CANDS, UE device 10 and wireless base station 12 establish a wireless communications link and may perform wireless communications over one of the frequency candidates from the narrowed set of frequency candidates FREQ_CANDS (e.g., by conveying UL and/or DL data). Searching for wireless base station 12 after radio boot up in this way may reduce the time required to find wireless base station 12 by an order of magnitude relative to an E-UTRA absolute radio frequency channel number (EARFCN) raster scan with an improved miss-detect rate, for example.

Figure 7:
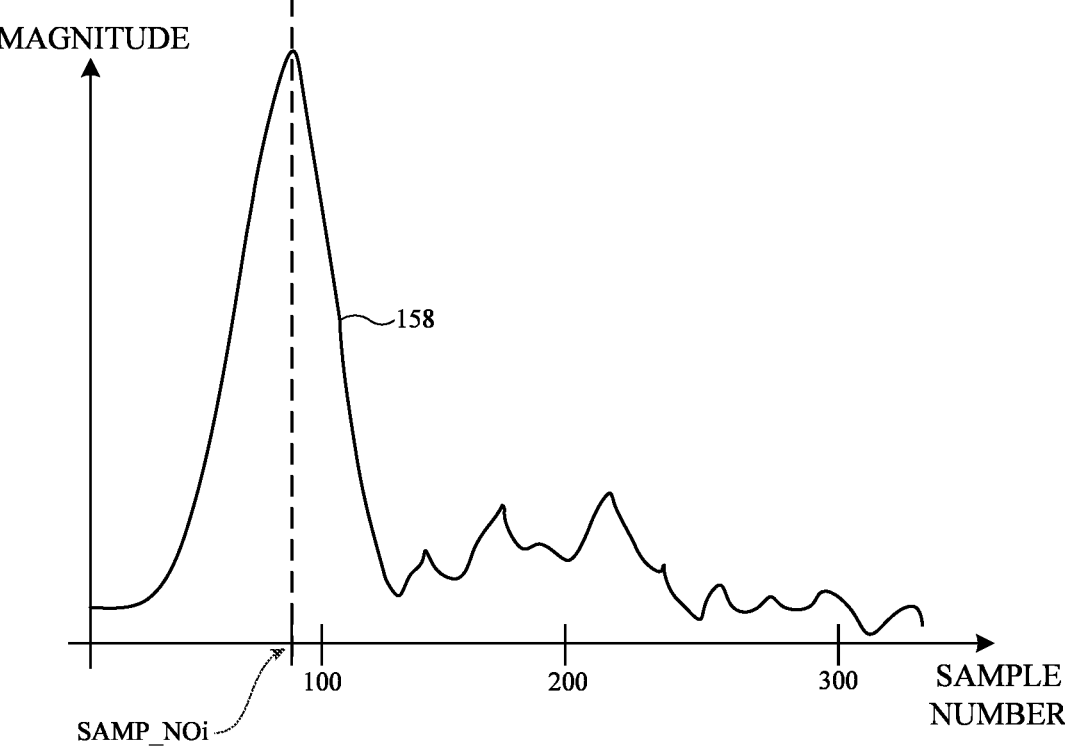
FIG. 7 is a plot showing how a peak magnitude value may be used to identify a sample number for use in correcting the timing of signals at a candidate frequency in accordance with some embodiments.

FIG. 7 is a diagram showing how signal analyzer 102 may perform peak detection. As shown in FIG. 7, curve 158 plots the magnitude of a single long CP hypothesis CPHYP_MAX processed by signal analyzer 102 of FIG. 5 (e.g., after coherent addition). Curve 158 may exhibit a peak at sample number SAMP_NOi due to the presence of the CP in the input signal at sample number SAMP_NOi. Sample number SAMP_NOi may thereby be used to adjust the symbol boundary timing for the input signal given that the input signal includes CPs at known locations within the subframe structure. The phase of the peak of curve 158 may be output as phase ANGLEi (e.g., for use in center frequency correction). In general, there may be a curve such as curve 158 for each of the long CP hypotheses CPHYP, where the selected long CP hypothesis (e.g., the long CP hypothesis associated with curve 158 of FIG. 5) is the long CP hypothesis having the highest peak value.

Figure 8:
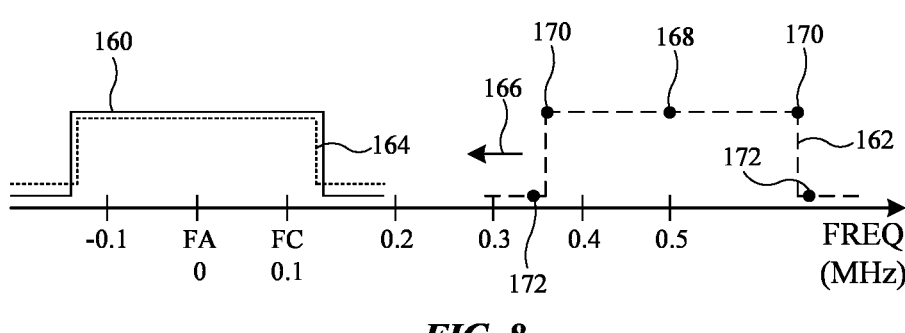
FIG. 8 is a frequency diagram showing how illustrative center frequency correction may be performed on signals at a candidate frequency in accordance with some embodiments.

FIG. 8 is a diagram showing one example of how center correction block 112 (FIG. 5) may perform the center correction algorithm on the selected long CP hypothesis based on the symbol boundary timing, the CFO, and the statistical model of the DL signals. In the example of FIG. 8, curve 160 plots the actual location of DL signals 20, centered at frequency FA. For each bandwidth BWi (e.g., for each iteration of operation 134), center correction block 112 may apply a statistical DL signal model (e.g., a model of a DL signal organized according to the corresponding protocol such as an LTE DL signal model) on the input signal around the candidate center frequency. Curve 162 plots one such applied DL signal model. Point 168 on curve 162 may correspond to OFDM and noise, plus a DC beam without data. Points 170 on curve 162 may correspond to OFDM and noise. Points 172 may correspond to noise only. In other words, the DL model structure may include a center bin without data, OFDM bins around the DC bin, and guard bins with noise only at the signal edges.

Center correction block 112 may sweep the DL signal model associated with curve 162 in frequency steps (e.g., 100 kHz steps) around its initial position (e.g., to the adjacent EARFCNs), as shown by arrow 166. Once the statistical model overlaps the actual signal, as shown by curve 164, statistical model 162 may accurately represent the actual DL signal. Center correction block 112 may, for example, conclude that the initial position is not correct while sweeping the statistical model, and that the position in which the statistical model generates the highest metric is the correct center frequency (e.g., when the statistical model overlaps with the actual signal location, which is likely to occur also with the correct BW hypothesis of the statistical model).

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-8 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 30 of FIG. 2). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. Wireless circuitry comprising:
a radio configured to receive radio-frequency signals via one or more antennas and configured to downconvert the radio-frequency signals to generate baseband signals; and
one or more processors configured to
apply a bandwidth filter to the baseband signals to generate filtered baseband signals,
switch the bandwidth filter between bandwidth configurations over time,
generate respective autocorrelation metrics based on the filtered baseband signals under each of the bandwidth configurations of the bandwidth filter, and
perform a search for a wireless base station based on the autocorrelation metrics, wherein the radio is configured to establish a link with the wireless base station in response to the search detecting a signal transmitted by the wireless base station.

2. The wireless circuitry of claim 1, the one or more processors being further configured to:
generate respective coherent sums based on each of the autocorrelation metrics, and
perform the search for the wireless base station based on the coherent sums.

3. The wireless circuitry of claim 2, the one or more processors being further configured to:
identify a respective peak in each of the coherent sums and a respective sample number associated with each of the peaks, and
perform the search for the wireless base station based on the sample numbers.

4. The wireless circuitry of claim 3, the one or more processors being further configured to:
correct a symbol boundary timing of the radio-frequency signals based on the sample number identified for a highest of the peaks.

5. The wireless circuitry of claim 3, the one or more processors being further configured to:
identify a phase of a highest of the peaks, and
apply a center frequency offset to the radio-frequency signals based on the phase of the highest of the peaks.

6. The wireless circuitry of claim 1, the one or more processors being further configured to:
generate a set of cyclic prefix hypotheses and a set of coherent sums for the set of cyclic prefix hypotheses, and
perform the search for the wireless base station based on the set of coherent sums.

7. The wireless circuitry of claim 6, the one or more processors being further configured to perform the search for the wireless base station based on a cyclic prefix hypothesis from the set of cyclic prefix hypotheses that corresponds to a maximum coherent sum in the set of coherent sums.

8. The wireless circuitry of claim 1, the one or more processors being further configured to generate the autocorrelation metrics by autocorrelating samples from the filtered baseband signals in a time domain.

9. The wireless circuitry of claim 8, the one or more processors being further configured to:
perform the search for the wireless base station based on a set of cyclic prefix hypotheses that is based on a highest of the autocorrelation metrics.

10. The wireless circuitry of claim 9, the one or more processors being further configured to:
perform the search for the wireless base station based on a set of coherent sums that is based on the set of cyclic prefix hypotheses.

11. The wireless circuitry of claim 10, the one or more processors being further configured to:
perform the search for the wireless base station based on a set of frequency candidates that is based on the set of coherent sums.

12. The wireless circuitry of claim 11, wherein the radio is configured to receive the radio-frequency signals over the set of frequency candidates, the one or more processors being further configured to perform the search for the wireless base station based on the radio-frequency signals received over the set of frequency candidates.

13. The wireless circuitry of claim 12, wherein the radio is further configured to modify at least some of the radio-frequency signals received over the set of frequency candidates using a symbol boundary timing correction, the symbol boundary timing correction being based on the set of coherent sums.

14. The wireless circuitry of claim 12, wherein the radio is further configured to modify at least some of the radio-frequency signals received over the set of frequency candidates using a center frequency offset, the center frequency offset being based on the set of coherent sums.

15. The wireless circuitry of claim 8, wherein the one or more processors are further configured to:
generate a first of the autocorrelation metrics by autocorrelating the filtered baseband signals as output by the bandwidth filter while the bandwidth filter exhibits a first bandwidth configuration,
generate a second of the autocorrelation metrics by autocorrelating the filtered baseband signals as output by the bandwidth filter while the bandwidth filter exhibits a second bandwidth configuration that is different from the first bandwidth configuration, and
perform the search over a set of frequency candidates that is selected based on a higher of the first of the autocorrelation metrics and the second of the autocorrelation metrics.

16. The wireless circuitry of claim 15, wherein the one or more processors are further configured to generate select the set of frequency candidates based on:

a statistical downlink signal model, and a center frequency correction that is based on the statistical downlink signal model, wherein the radio is further configured to modify at least some of the radio-frequency signals received over the set of frequency candidates using the center frequency correction.

17. The wireless circuitry of claim 1, wherein the radio is further configured to:

modify at least some of the radio-frequency signals using a symbol boundary timing correction, the symbol boundary timing correction being based on the autocorrelation metrics, and the one or more processors being further configured to perform the search for the wireless base station by searching for the signal in the radio-frequency signals modified using the symbol boundary timing correction.

18. The method of claim 1, the one or more processors being further configured to generate one of the autocorrelation metrics by multiplying each sample in a series of samples in the filtered baseband signals by a respective additional sample located at a fixed sample number from that sample in the series of samples.

19. A method of operating wireless circuitry, the method comprising:

receiving, using a radio, radio-frequency signals;

converting, using the radio, the radio-frequency signals into baseband signals;

generating filtered baseband signals by applying a bandwidth filter to the baseband signals;

switching the bandwidth filter between different bandwidth configurations over time;

outputting, using one or more processors, a different respective autocorrelation metric based on the filtered baseband signals that are generated while the bandwidth filter exhibits each of the different bandwidth configurations;

performing, using the radio, a search for a wireless base station based on the different respective autocorrelation metrics; and establishing, using the radio, a link with the wireless base station in response to the search detecting a signal transmitted by the wireless base station.

20. A method of operating wireless circuitry, the method comprising:

receiving, using a radio, radio-frequency signals;

converting, using the radio, the radio-frequency signals into baseband signals;

generating first filtered baseband signals by applying a bandwidth filter to the baseband signals while the baseband filter has a first bandwidth configuration;

generating second filtered baseband signals by applying the bandwidth filter to the baseband signals while the baseband filter has a second bandwidth configuration that is different than the first bandwidth configuration;

outputting, using one or more processors, a first autocorrelation metric based on the first filtered baseband signals;

outputting, using the one or more processors, a second autocorrelation metric based on the second filtered baseband signals;

performing, using the radio, a search for a wireless base station over a set of candidate frequencies that is selected based on a higher of the first autocorrelation metric and the second autocorrelation metric; and establishing, using the radio, a link with the wireless base station in response to the search detecting a signal transmitted by the wireless base station.

* * * * *